United States Patent
Nagano et al.

(10) Patent No.: US 6,661,252 B2
(45) Date of Patent: Dec. 9, 2003

(54) MATRIX SWITCH DEVICE HIGH IN ISOLATION BETWEEN TERMINALS THEREOF, SMALL IN SIZE, AND LOW IN MANUFACTURING COST

(75) Inventors: Nobuo Nagano, Tokyo (JP); Kazuhiko Onda, Tokyo (JP); Junichi Somei, Nara (JP)

(73) Assignees: NEC Compound Semiconductor Devices, Ltd., Kanagawa (JP); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/190,325

(22) Filed: Jul. 3, 2002

(65) Prior Publication Data

US 2003/0016071 A1 Jan. 23, 2003

(30) Foreign Application Priority Data

Jul. 4, 2001 (JP) ........................................ 2001-203228

(51) Int. Cl.[7] ................................................. G11C 7/00
(52) U.S. Cl. ............................. 326/37; 326/47; 326/101
(58) Field of Search ............................. 326/37, 47, 101

(56) References Cited

U.S. PATENT DOCUMENTS 4,399,439 A * 8/1983 Upadhyayula ......... 340/825.91
6,525,563 B2 * 2/2003 Hamano et al. .............. 326/41

* cited by examiner

Primary Examiner—Anh Tran
(74) Attorney, Agent, or Firm—Choate, Hall & Stewart (57) ABSTRACT

A matrix switch device comprises a semiconductor integrated circuit chip comprising a 2×2 matrix switch having two input terminals and two output terminals and an SPDT switch at a stage subsequent to the 2×2 matrix switch, the SPDT switch having two input terminals and one output terminal, wherein electrical connection is performed between one of the output terminals of the 2×2 matrix switch and one of the input terminals of the SPDT switch, and wherein the two input terminals and the other of said output terminals of the 2×2 matrix switch, and the other input terminal and the output terminal of the SPDT switch are led out of the semiconductor integrated circuit chip.

8 Claims, 11 Drawing Sheets

MATRIX SWITCH DEVICE HIGH IN ISOLATION BETWEEN TERMINALS THEREOF, SMALL IN SIZE, AND LOW IN MANUFACTURING COST

BACKGROUND OF THE INVENTION

The present invention relates to a matrix switch device, which is mounted in a home receiving antenna of a digital satellite broadcasting (DSB) system and is suitable for switching input signals from a plurality of satellites.

Multi-satellite systems and multi-channel systems are increasingly used for satellite broadcasting. Therefore, as a low noise block (LNB), a matrix switch device for switching input signals from the plurality of satellites and especially a matrix switch integrated circuit, which is a matrix switch device formed as a semiconductor integrated circuit, are highly demanded. Incidentally, the LNB is a BS/CS receiving front-end mounted in the home receiving antenna of the DBS system. To this end, a 2×2 matrix switch integrated circuit, which is a matrix switch device having two input terminals and two output terminals, is developed.

Hitherto, optimization of the size of the elements of the 2×2 matrix switch integrated circuit has been performed for improving ON/OFF characteristics of the switch thereof. Optimization of wiring layout on the integrated circuit chip thereof has also been performed for reducing signal interference caused by dense wiring for inter-connecting the switches thereof. Further, optimization of the package thereof for mounting the 2×2 matrix switch integrated circuit therein, and optimization of mounting and assembly methods have also been performed for achieving high isolation characteristics.

On the other hand, a matrix switch device is demanded, the matrix switch device being capable of receiving broadcasting signals from the plurality of satellites and switching between multiple channels, the number of channels being more than previously achieved. For example, the recently used DBS system, which receives broadcasting signals from two satellites, requires a 4×2 matrix switch device for receiving and switching horizontally and vertically polarized wave signals from the satellites. An exemplary 4×2 matrix switch device comprises first and second input terminals to which the horizontally and vertically polarized wave signals are input from one of the satellites, and comprises third and fourth input terminals to which the horizontally and vertically polarized wave signals are input from another satellite. A very high isolation characteristic is required between the first and second input terminals and between the third and fourth input terminals.

The above-described 4×2 matrix switch device further comprises two 2×2 matrix switch integrated circuits which achieve high isolation, a plurality of PIN diodes, and the mounting board. The 2×2 matrix switch integrated circuits and the PIN diodes are mounted on the mounting board and are inter-connected by wiring lines on the mounting board. Other matrix switch integrated circuits and PIN diodes are disposed between the first and second input terminals and between the third and fourth input terminals where high isolation is required, and the first to fourth input terminals are inter-connected by external wiring lines. Therefore, signal interference in the wiring lines on the board is reduced and the high isolation characteristic is achieved.

The 4×2 matrix switch device each comprises two PIN diodes on four circuit wiring lines, that is, eight PIN diodes in total. The PIN diodes, however, requires high isolation for signals transmitted in the reverse direction (from the output direction to the input direction). Therefore, the PIN diodes must be disposed in series. Accordingly, the number of parts of the existing 4×2 matrix switch device is at least ten. This large number of parts results in a mounting board with an increased area and an increased number of assembly-adjusting procedures. Accordingly, the cost of the 4×2 matrix switch device also increases.

In view of the above, a low-cost 4×2 matrix switch integrated circuit should be developed. This 4×2 matrix switch integrated circuit comprises twelve switches for example. The control voltage of the switches is set to a suitable level so that the first and second output terminals thereof can separately select and switch the input signals.

As in the case of the 2×2 matrix switch integrated circuit, optimization of the size of the elements of the 4×2 matrix switch integrated circuit is performed for increasing the ON/OFF characteristics of the switches. Optimization of the wiring layout on the IC chip thereof is also performed for reducing signal interference caused by dense wiring for inter-connecting the switches. Further, optimization of the package thereof for mounting the 4×2 matrix switch integrated circuit therein, and optimization of mounting and assembly methods are also performed for increasing the isolation characteristic.

However, since the number of switches of the 4×2 matrix switch integrated circuit is increased, the amount of wiring lines for inter-connecting the switches becomes twice as much as that of the 2×2 matrix switch integrated circuit. Further, the wiring line on the integrated circuit chip becomes complicated due to the increased number of D lines for the switches. Subsequently, the distance between the switches on the integrated circuit chip decreases, and the density and crossovers of the signal wiring lines increase more than in the case of the 2×2 matrix switch integrated circuit. Since the signal interference is not sufficiently reduced, the isolation of the 4×2 matrix switch integrated circuit does not easily increase.

Keeping sufficient distances between the switches (FET) and the signal wiring line is effective for decreasing the signal interference. However, this method may result in a semiconductor integrated circuit chip with an increased size and an increased cost of the switches. In such a case, a large-sized package will be required according to the increased size of the semiconductor integrated circuit chip. However, manufacturing a new production line for such packages will significantly increase the cost of the switches.

SUMMARY OF THE INVENTION

Accordingly, the object of the present invention is to provide a matrix switch device comprising a semiconductor integrated circuit chip functioning as a satellite reception unit having high isolation between the terminals thereof and that is small and susceptible of low cost of manufacture because of the reduced number of elements thereof.

A matrix switch device according to a first aspect of the present invention comprises a semiconductor integrated circuit chip. The semiconductor integrated circuit chip comprises a 2×2 matrix switch having two input terminals and two output terminals, and an SPDT (Single Pole Double Throw) switch at a stage subsequent to the 2×2 matrix switch, which has two input terminals and one output terminal. Electrical connection is performed between one of the output terminals of the 2×2 matrix switch and one of the input terminals of the SPDT switch. The two input terminals and the other of said output terminals of the 2×2 matrix switch, and the other input terminal and the output terminal of the SPDT switch are led out of the semiconductor integrated circuit chip.

A matrix switch device according to a second aspect of the present invention comprises a semiconductor integrated circuit chip. The semiconductor integrated circuit chip comprises a 2×2 matrix switch having two input terminals and two output terminals, and an SPDT switch at a stage subsequent to the 2×2 matrix switch, which has two input terminals and one output terminal. The input terminals and the output terminals of the 2×2 matrix switch, and the input terminals and the output terminal of the SPDT switch are led out of the semiconductor integrated circuit chip.

A 4×2 matrix switch device according to a third aspect of the present invention comprises a first matrix switch unit comprising the above-described matrix switch device packaged in a first package and a second matrix switch unit comprising the matrix switch device packaged in a second package. The 4×2 matrix switch device further comprises a first external wiring line and a second external wiring line. Electrical connection is performed between the other of said output terminals of the 2×2 matrix switch of the first matrix switch unit and the other of said input terminals of the SPDT switch of the second matrix switch unit via the first external wiring line outside the first and second packages. Electrical connection is also performed between the other of said output terminals of the 2×2 matrix switch of the second matrix switch unit and the other of said input terminals of the SPDT switch of the first matrix switch unit via the second external wiring line outside the first and second packages.

The other objects of this invention will become clear as the description proceeds.

DESCRIPTION OF THE PREFERRED EMBODIMENTS

In order to facilitate an understanding of the present invention, description will at first be made about the related matrix switch related to the present invention with reference to the drawings.

Figure 1A:
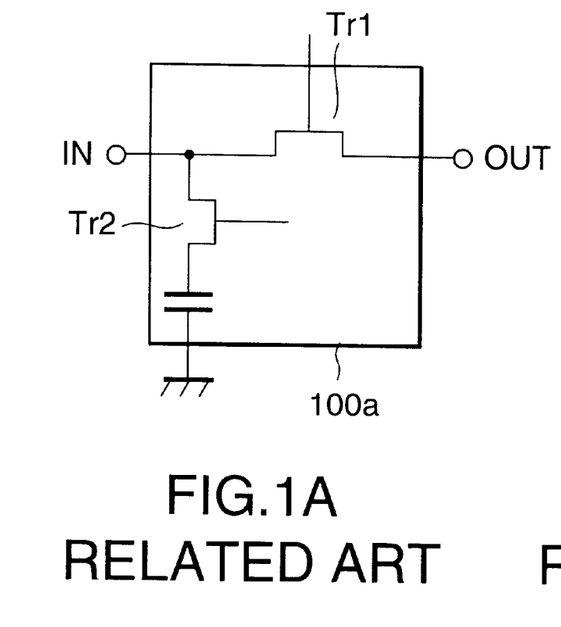
FIG. 1A is a circuit diagram of a switch of a related matrix switch device.
Figure 1B:
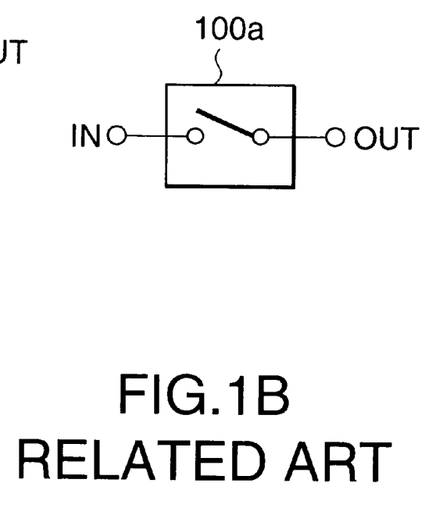
FIG. 1B schematically shows the switch.
Figure 2A:
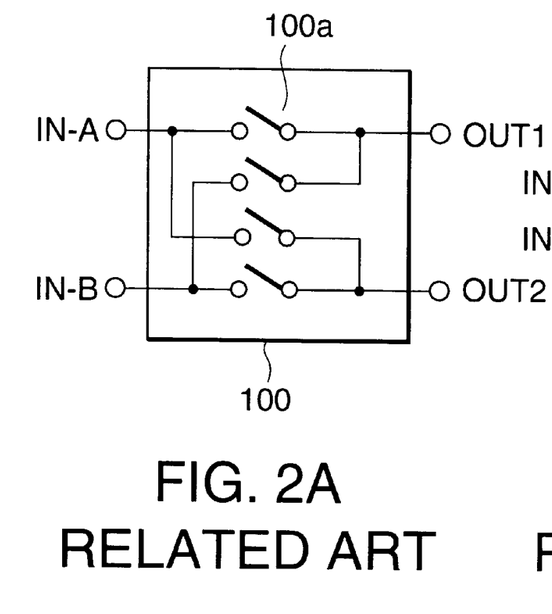
FIG. 2A is a circuit diagram of the related matrix switch device.

First, the configuration of a related 2×2 matrix switch integrated circuit 100 will be described with reference to FIGS. 1A, 1B, 2A, and 2B. As shown in FIG. 2A, the 2×2 matrix switch integrated circuit 100 comprises two input terminals IN-A and IN-B, four switches 100a, and two output terminals OUT1 and OUT2. FIG. 1A shows the configuration of the switch 100a, which comprises an input terminal, an output terminal, two field effect transistors (FET) Tr1 and Tr2, and a capacitor. The transistor Tr1, which has an ON characteristic, has one end connected to the input terminal and another end connected to the output terminal. The transistor Tr2, which has an OFF characteristic, has one end connected to the input terminal and another end RF-grounded via the capacitor. When one of these transistors Tr1 and Tr2 is operated and the other is not operated, ON/OFF operation is performed. FIG. 1B is a schematic diagram of the switch 100a.

Figure 2B:
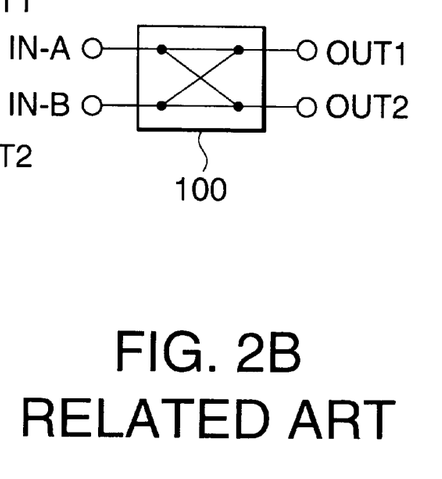
FIG. 2B is schematically shows the function of the related matrix switch device.

FIG. 2B is a conceptual illustration of the 2×2 matrix SW-IC 100. When the control voltage of the switch 100a is set to a suitable level, the output terminals OUT1 and OUT2 can separately select and switch the input signals.

Hitherto, optimization of the size of the elements of the 2×2 matrix switch integrated circuit 100 is performed for improving the ON/OFF characteristics of the switch 100a. Optimizations of the wiring layout on the integrated circuit chip thereof are also performed for reducing signal interference caused by dense wiring for inter-connecting the switches 100a. Further, optimization of the package for mounting the 2×2 matrix SW-IC 100 therein, and optimization of the mounting and assembly methods are also performed for achieving high isolation characteristics.

Figure 3:
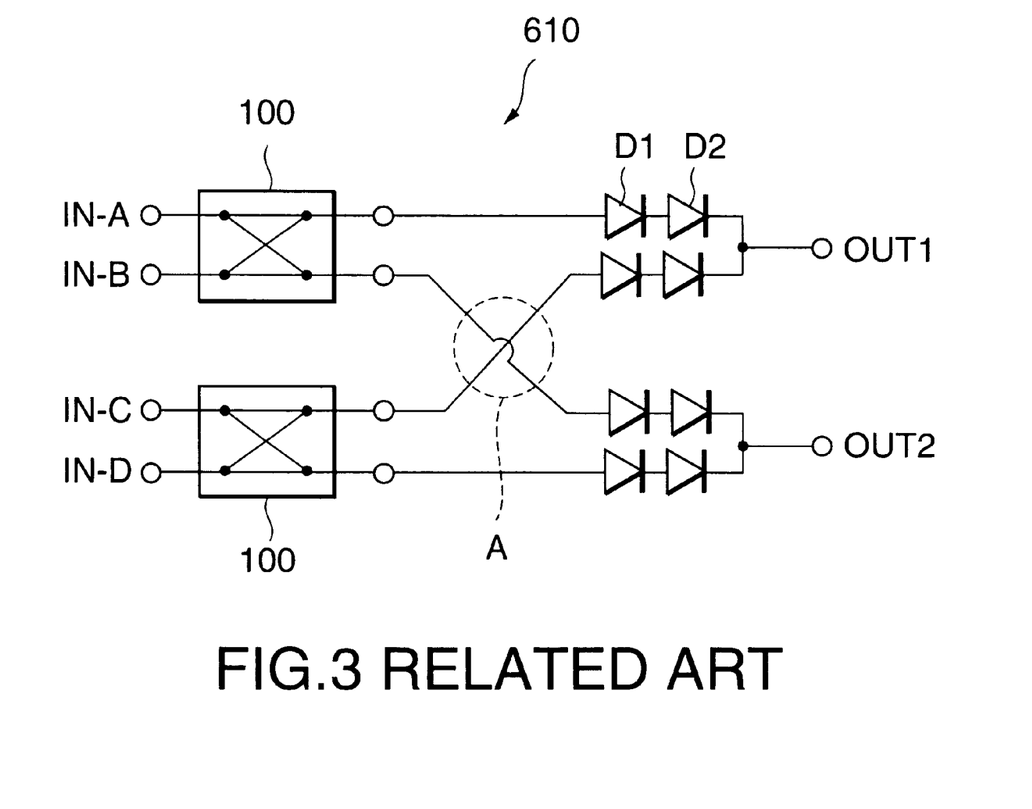
FIG. 3 schematically shows the configuration of a related matrix switch device.

On the other hand, a matrix switch device, which receives a broadcasting signal from the plurality of satellites and which can switch between multiple channels, the number of channels being more than previously achieved, is demanded. FIG. 3 shows the configuration of an exemplary 4×2 matrix switch device 610, which comprises two 2×2 matrix switch integrated circuits 100, four PIN diodes D1, four PIN diodes D2, input terminals IN-A, IN-B, IN-C, and IN-D, and output terminals OUT1 and OUT2. The recently used DBS system, which receives broadcasting signals from first and second satellites for example, requires such a 4×2 matrix switch device for receiving and switching horizontally and vertically polarized wave signals from the satellites. High isolation is required between the input terminals IN-A and IN-B where horizontally and vertically polarized wave signals are input from the first satellite and between the input terminals IN-C and IN-D where horizontally and vertically polarized wave signals are input from the second satellite, for reducing the interference between the signals from the first and second satellites.

More specifically, two 2×2 matrix switch integrated circuits 100, which achieve high isolation, and the plurality of PIN diodes D1 and D2 are mounted on a mounting board and are inter-connected by wiring line on the mounting board. These matrix switch integrated circuits and the PIN diodes are disposed between the input terminals IN-A and IN-B and between the input terminals IN-C and the IN-D, where high isolation is required. The input terminals IN-A to IN-D are connected by external wiring lines. Therefore, signal interference in the wiring lines on the board is reduced and the high isolation is achieved.

The 4×2 matrix switch device 610 comprises one of the PIN diodes D1 and one of the PIN diodes D2 on the wiring lines thereof. The PIN diodes D1 and D2, however, require high isolation for signals transmitted in the reverse direction (from the output direction to the input direction). Therefore, the PIN diodes D1 and D2 must be disposed in series. Accordingly, the 4×2 matrix switch device 610 has at least ten parts. This large number of parts results in the mounting board with an increased area and an increased number of assembly-adjusting procedures. Accordingly, the cost of the 4×2 matrix switch device 610 also increases.

Figure 4A:
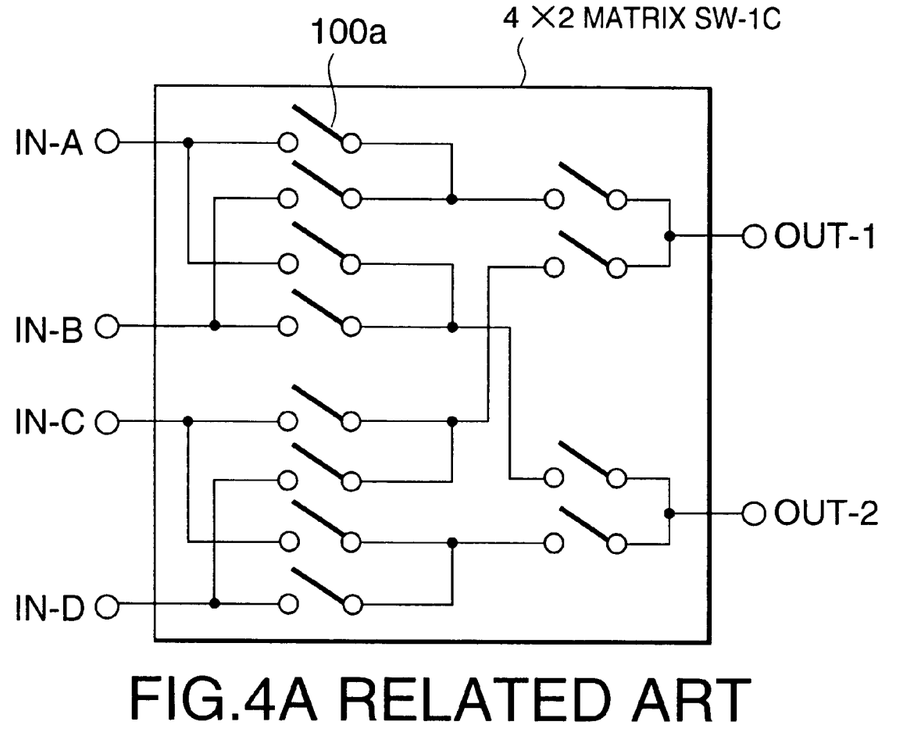
FIG. 4A is a circuit diagram of a related 4×2 matrix switch integrated circuit, FIG. 4B schematically shows the related 4×2 matrix switch integrated circuit.
Figure 4B:
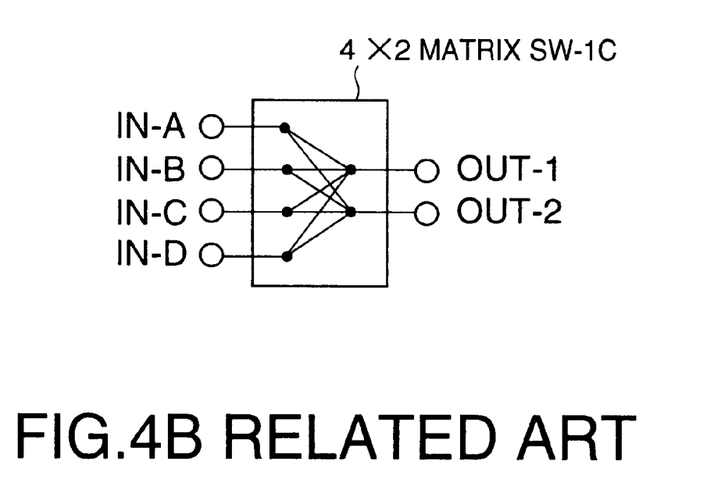

In view of the above, a low-cost 4×2 matrix switch integrated circuit should be developed. FIG. 4A illustrates the configuration of an exemplary 4×2 matrix switch integrated circuit comprising twelve switches 100a. FIG. 4B is a conceptual illustration of the 4×2 matrix switch integrated circuit. The control voltage of the switches 100a is set to a suitable level so that the output terminals OUT-1 and OUT-2 can separately select and switch input signals.

As in the case of the 2×2 matrix switch integrated circuit 100, optimization of the size of the elements of the 4×2 matrix switch integrated circuit is performed for increasing the ON/OFF characteristics of the switches 100a. Optimization of the wiring layout on the IC chip thereof is also performed for reducing signal interference caused by dense wiring for inter-connecting the switches. Further, optimization of the package thereof for mounting the 4×2 matrix switch integrated circuit therein, and optimization of the mounting and assembly methods is also performed for increasing the isolation characteristic.

However, since the number of switches of the 4×2 matrix switch integrated circuit is increased, the amount of wiring lines for inter-connecting the switches 100a becomes twice as much as that of the 2×2 matrix switch integrated circuit 100. Further, the wiring on the integrated circuit chip becomes complicated due to the increased number of D lines for the switches 100a. Subsequently, the distance between the switches on the integrated circuit chip decreases, and the density and crossovers of the signal wiring lines increase more than in the case of the 2×2 matrix switch integrated circuit 100. Since the signal interference is not sufficiently reduced, the isolation of the 4×2 matrix switch integrated circuit does not easily increase.

Next, a matrix switch device according to embodiments of the present invention will now be described with reference to FIGS. 5A to 14.

Figure 5A:
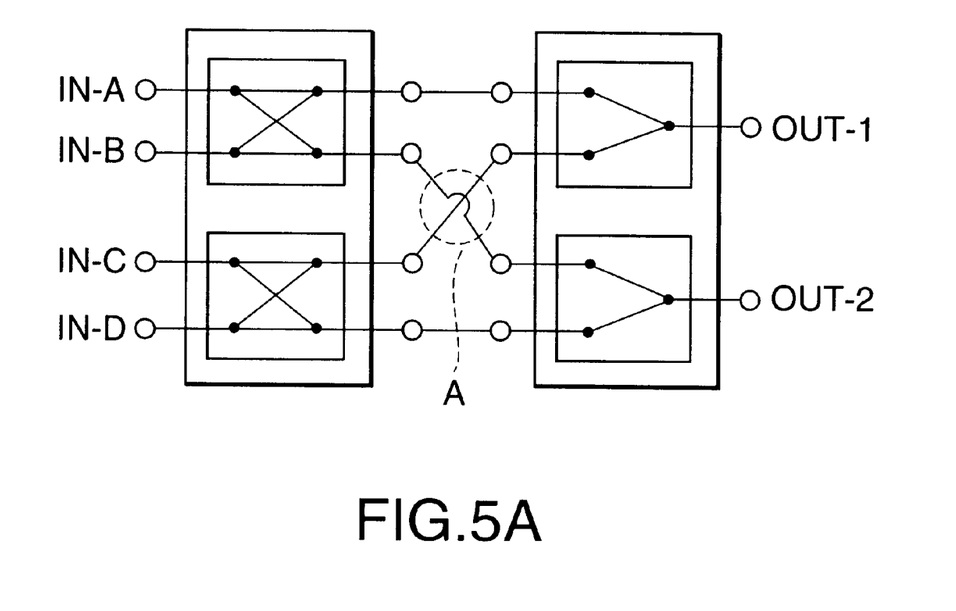
FIG. 5A shows a 4×2 matrix switch integrated circuit comprising two semiconductor integrated circuits.
Figure 5B:
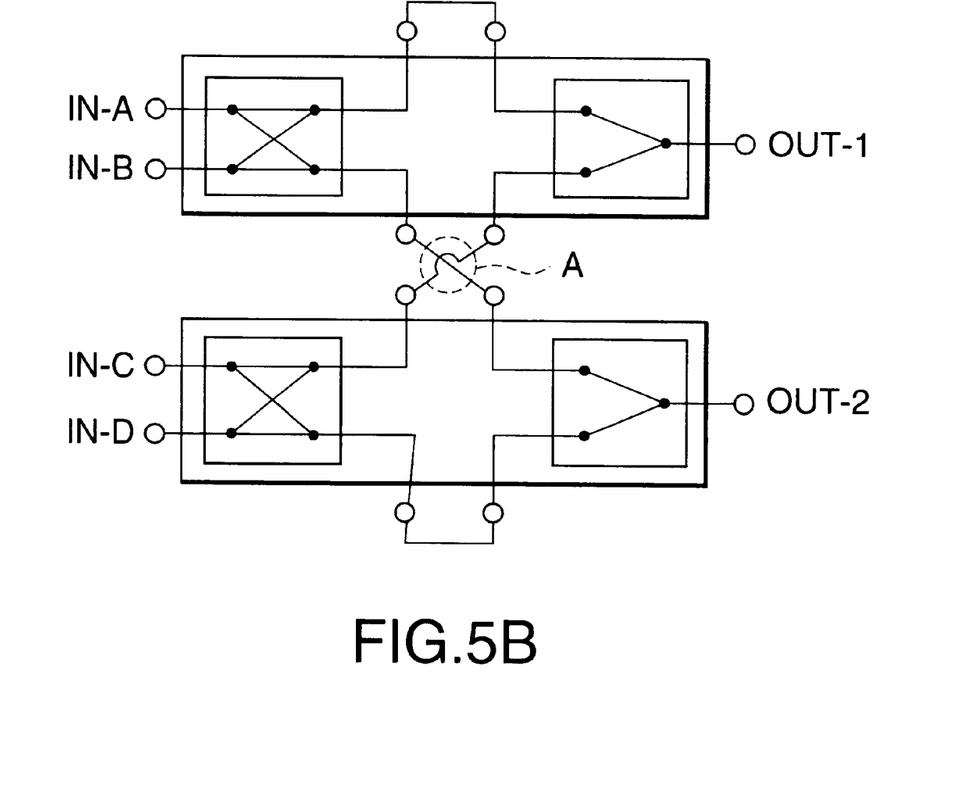
FIG. 5B shows another 4×2 matrix switch integrated circuit comprising two semiconductor integrated circuits.

As has been described, achieving a high isolation characteristic at low cost is difficult for a 4×2 matrix switch device comprising one semiconductor integrated circuit. FIGS. 5A and 5B show the configuration of a 4×2 matrix switch device comprising two semiconductor integrated circuits. As shown in the drawings, two 2×2 matrix switches and two single-pole double-throw (SPDT) switches are included in two semiconductor integrated circuits and are interconnected.

Figure 6A:
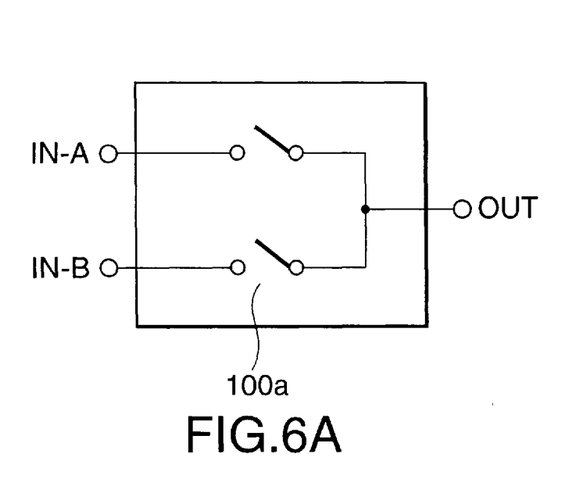
FIG. 6A is a circuit diagram of a single-pole double-throw (SPDT) switch, FIG. 6B schematically shows the SPDT switch.
Figure 6B:
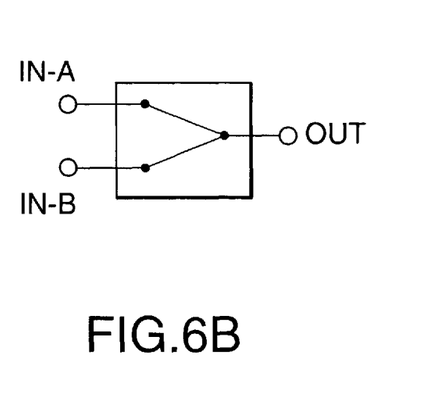

FIGS. 6A and 6B illustrate the configuration of the SPDT switch. The control voltage of the switch 100a is set to a suitable level so that the SPDT switch can select one of two input signals and output it from the output terminal thereof.

As shown in FIG. 5A, two 2×2 matrix switches are integrated in one semiconductor integrated circuit, and two SPDT switches are integrated in another semiconductor integrated circuit. Since signals from different satellites are input to the input terminals IN-A and IN-B and IN-C and IN-D, a very high isolation must be maintained. Therefore, the level of isolation between the 2×2 matrix switches and between the SPDT switches must be especially high. However, maintaining high isolation is rather difficult for the semiconductor integrated circuit shown on the left in FIG. 5A since the 2×2 matrix switches are integrated in the same semiconductor integrated circuit chip. Generally, the amount of signal interference between wiring lines changes according to the distance between the wiring lines. In such a case, the isolation increases as the distance between the 2×2 matrix switches increases and the size of the chip thereof also increases. Accordingly, the cost of the matrix switch device significantly increases. Likewise, maintaining high isolation is difficult for the semiconductor integrated circuit shown on the right in FIG. 5A since the SPDT switches are integrated on the same semiconductor integrated circuit chip. Thus, achieving a high isolation characteristic at low cost is quite difficult for the 4×2 matrix switch device shown in FIG. 5A.

The other 4×2 matrix switch device shown in FIG. 5B comprises two semiconductor integrated circuit chips each comprising a 2×2 matrix switch and an SPDT switch formed thereon. In such a case, high isolation can be easily maintained between the 2×2 matrix switches and between the SPDT switches, since the two 2×2 matrix switches are formed on separate semiconductor integrated circuit chips and the two SPDT switches are formed on separate semiconductor integrated circuit chips. The input terminals IN-A and IN-B, and the input terminals IN-C and IN-D are inter-connected by external wiring line, so that each of input signals input to these input terminals can be switched to the predetermined semiconductor integrated circuit chips. According to the above-described configuration, crosstalk occurring at a part A, where external wiring lines cross each other, can be sufficiently reduced, and the SPDT switches, which switch the signals and output the same, can exhibit high isolation characteristics. Thus, the 4×2 matrix switch device shown in FIG. 5B can achieve high isolation characteristic at low cost.

Figure 7:
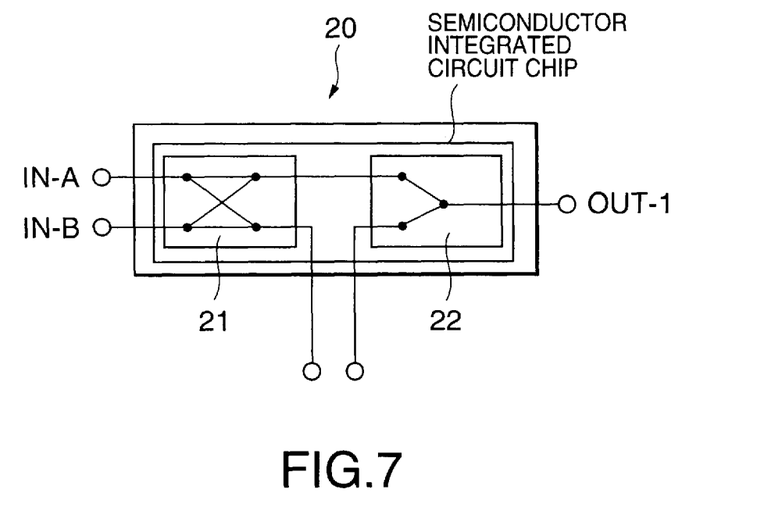
FIG. 7 schematically shows the configuration of a matrix switch integrated circuit device according to a first embodiment of the present invention.

FIG. 7 illustrates a matrix switch device 20 according to a first embodiment of the present invention. The matrix switch device 20 is formed as a semiconductor integrated circuit chip comprising a 2×2 matrix switch 21 having two input terminals IN-A and IN-B and two output terminals, and an SPDT switch 22 having two input terminals and an output terminal OUT-1.

Electrical connection is performed between one of the output terminals of the 2×2 matrix switch 21 and one of the input terminals of the SPDT switch 22. The input terminals IN-A and IN-B, and the other input terminal and the output terminal OUT-1 of the 2×2 matrix switch 21, which function as external terminals, are led out of the semiconductor integrated circuit chip.

When a 4×2 matrix switch device comprising two 2×2 matrix switch devices 20 as mentioned above is formed, a very high isolation between channels, that is, an OFF characteristic is required for the SPDT switches 22.

Therefore, when the matrix switch device 20 is in mass-production, the isolation characteristic of the SPDT switch 22 should be screened and evaluated.

Figure 8:
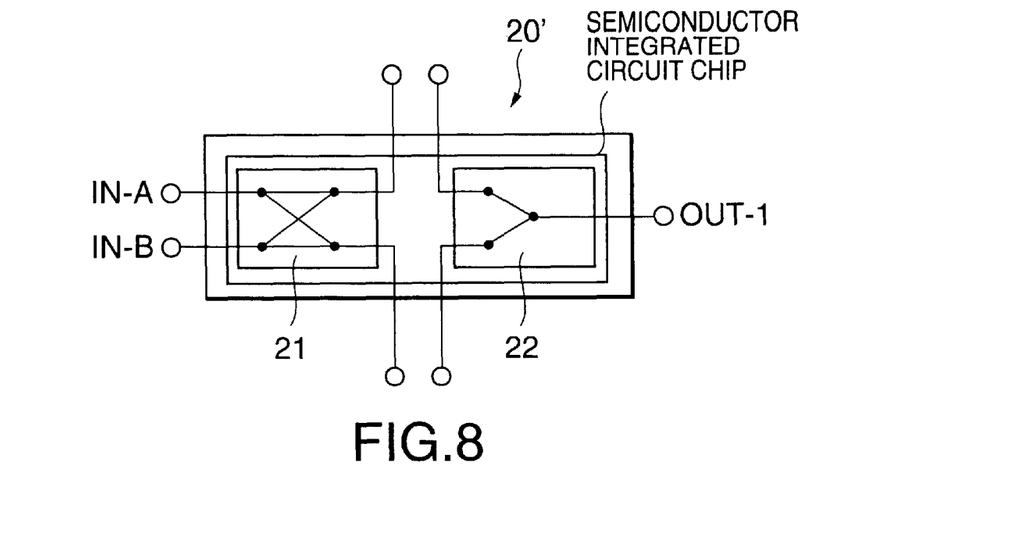
FIG. 8 schematically shows the configuration of a matrix switch device according to a second embodiment of the present invention.

To this end, a matrix switch device 20' according to a second embodiment of the present invention is provided as shown in FIG. 8. The configuration of the matrix switch device 20' is substantially the same as that of the matrix switch device 20, except that both the output terminals of the 2×2 matrix switch 21 and both the input terminals of the SPDT switch 22 are led out of the semiconductor integrated circuit chip. According to the configuration, the isolation characteristic of the SPDT switch 22 can be screened and evaluated.

When connection is performed between one of the output terminals of the 2×2 matrix switch 21 and one of the input terminals of the SPDT switch 22, say, on the mounting board, the function of the matrix switch device 20' becomes the same as that of the matrix switch device 20.

Figure 9:
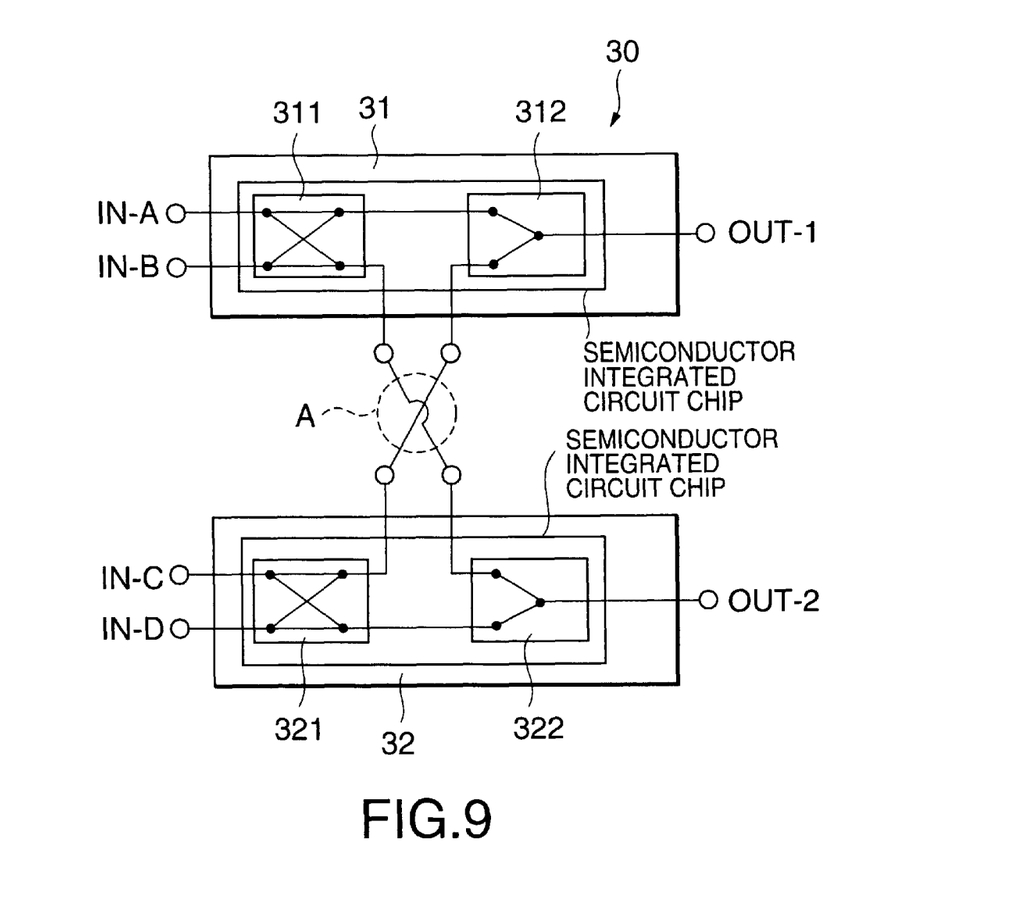
FIG. 9 schematically shows the configuration of a matrix switch device according to a third embodiment of the present invention.

FIG. 9 illustrates a 4×2 matrix switch device 30 according to a third embodiment of the present invention. The 4×2 matrix switch device 30 comprises matrix switch devices 31 and 32, which have the same configuration as that of the matrix switch device 20 shown in FIG. 7. The 4×2 matrix switch device 30 further comprises first and second external wiring lines.

The matrix SW devices 31 and 32 have a 2×2 matrix switch 311 and an SPDT switch 312, and a 2×2 matrix switch 321 and an SPDT switch 322, respectively. The 2×2 matrix switch 311 and the SPDT switch 312, and the 2×2 matrix switch 321 and the SPDT switch 322 are integrated in the two different semiconductor integrated circuit chips, respectively.

Connection is performed between one of the output terminals of the 2×2 matrix switch 311, which acts as an external output terminal, and one of the input terminals of the SPDT switch 322, which acts as another external input terminal, by the first external wiring line. Connection is performed between one of the output terminals of the 2×2 matrix switch 321, which acts as another external output terminal, and one of the input terminals of the SPDT switch 312, which acts as another external input terminal, by the second external wiring line. The first and second external wiring lines are electrically insulated and physically cross each other. Therefore, the matrix switch device 30 can achieve a high isolation characteristic between the input terminals IN-A and IN-B, and the input terminals IN-C and IN-D. Since the matrix switch device 30 comprises only two integrated circuit chips, the area of the mounting board, on which the matrix switch device 30 is mounted, can be significantly reduced. Further, as the number of parts to be wired decreases, the number of assembly procedures also decrease. Accordingly, the manufacturing cost of the 4×2 matrix switch device 30 can be significantly reduced.

For example, the number of parts of the 4×2 matrix switch device 30 is two whereas that of the 4×2 matrix switch device 610 is ten. For reducing the interference between signals from two satellites significantly, the signal interference at the parts A shown in FIGS. 3 and 9 should be reduced to a sufficient degree. Since the part A of the matrix switch device 30 is outside the integrated circuits, the signal interference can be reduced to the sufficient degree. Further, because of the reduced number of parts, that is, the two semiconductor integrated circuit chips, the 4×2 matrix switch device 30 can be manufactured at low cost and becomes highly efficient.

Figure 10:
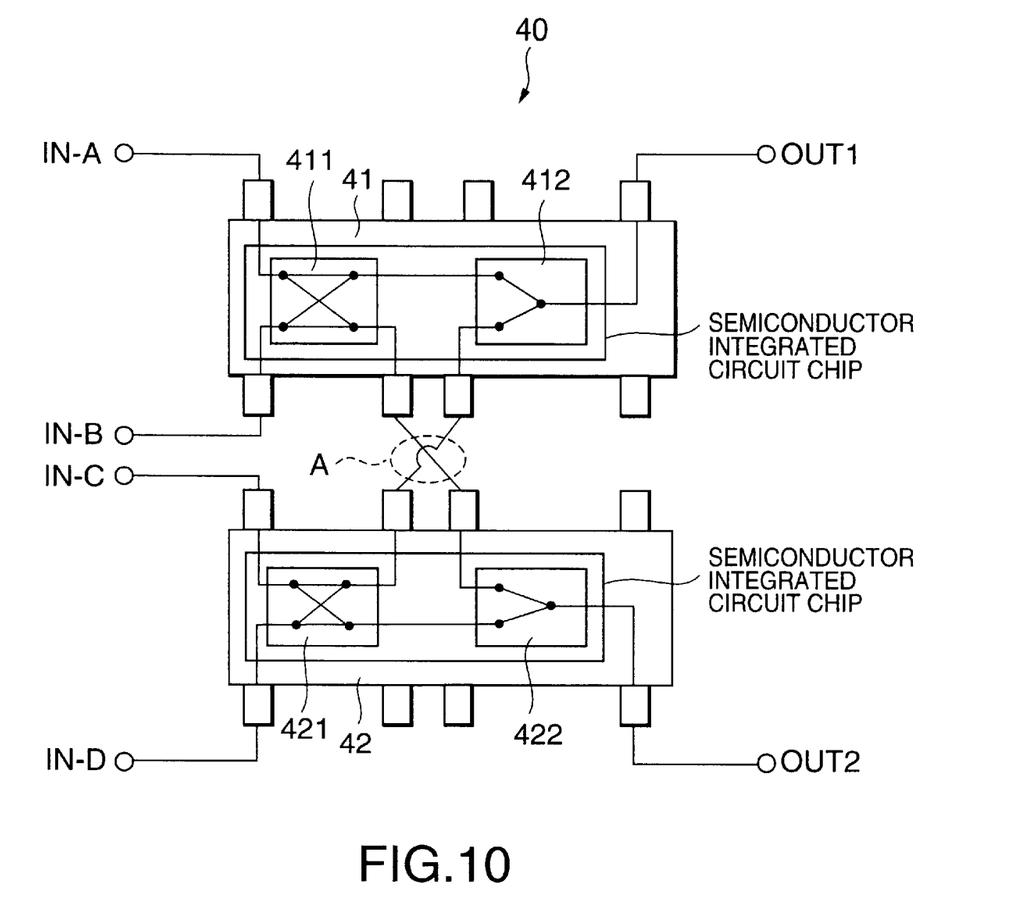
FIG. 10 schematically shows the configuration of a matrix switch device according to a fourth embodiment of the present invention.

FIG. 10 illustrates a 4×2 matrix switch device 40 according to a fourth embodiment of the present invention. The 4×2 matrix switch device 40 comprises two matrix switch devices 41 and 42, which have the same configuration as that of the matrix switch device 20 shown in FIG. 7 and first and second external wiring lines. Further, the terminals of the two matrix switch devices 41 and 42 are mirror-symmetrically disposed.

The matrix switch device 41 has a 2×2 matrix switch 411 and an SPDT switch 412 in the semiconductor integrated circuit chip thereof, and the matrix switch device 42 has a 2×2 matrix switch 421 and an SPDT switch 422 in the semiconductor integrated circuit chip thereof.

One of the two output terminals of the 2×2 matrix switch 411 is an external output terminal and is connected to one of the two input terminals of the SPDT switch 422 via the first external line. One of the two output terminals of the 2×2 matrix switch 421 is an external output terminal and is connected to one of the two input terminals of the SPDT switch 412, which acts as an external input terminal, via the second external wiring line. The first and second external wiring lines are electrically insulated and physically cross each other.

When mounting the matrix switch devices 41 and 42 on a mounting board, crosstalk occurring at the part A should be reduced to a sufficient degree. As the terminals of the matrix switch devices 41 and 42 are mirror-symmetrically disposed, the length of the first and second external wiring lines that cross each other at the part A can be reduced to a sufficient degree. Since the length of the wiring lines is reduced, isolation between the signals can be very high.

Figure 11:
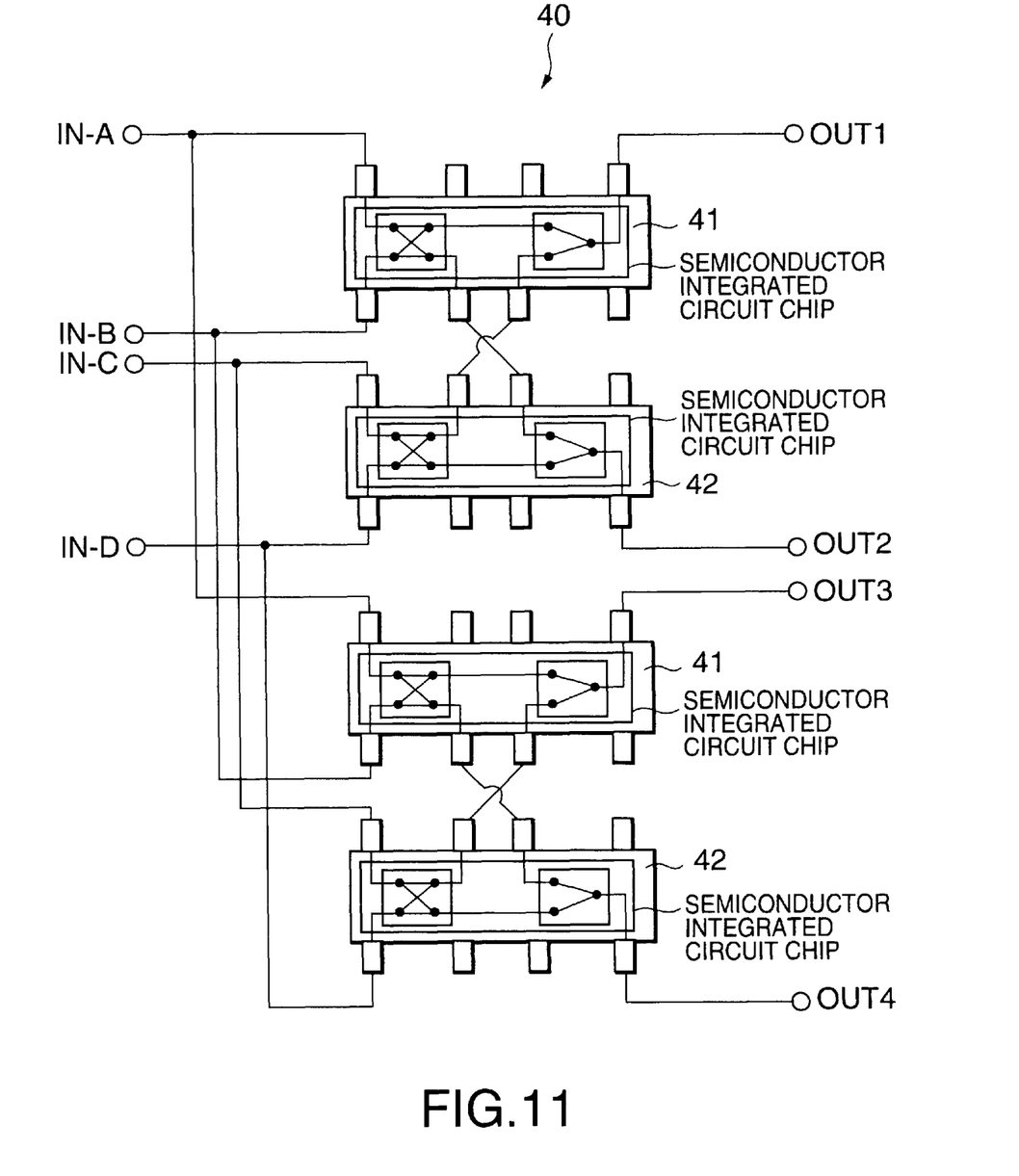
FIG. 11 schematically shows the configuration of a matrix switch device according to a fifth embodiment of the present invention.

FIG. 11 illustrates a 4×4 matrix switch device 50 according to a fifth embodiment of the present invention. The 4×4 matrix switch device 50 comprises a first pair of matrix switch devices 41 and 42 having two output terminals OUT1 and OUT2, and a second pair of matrix switch devices 41 and 42 having two output terminals OUT3 and OUT4. Further, the 4×4 matrix switch device 50 comprises first to eighth external wiring lines.

One of the two output terminals of the 2×2 matrix switch 411 of the first pair is an external output terminal and is connected to one of the input terminals of the SPDT switch 422, which acts as an external input terminal, via the first external wiring line. One of the two output terminals of the 2×2 matrix switch 421 of the first pair is an external output terminal and is connected to one of the two input terminals of the SPDT switch 412, which acts as an external input terminal, via the second external wiring line. The first and second external wiring lines are electrically insulated and physically cross each other.

One of the two output terminals of the 2×2 matrix switch 411 of the second pair is an external output terminal and is connected to one of the input terminals of the SPDT switch 422, which acts as an external input terminal, via the third external wiring line. One of the two output terminals of the 2×2 matrix switch 421 of the second pair is an external output terminal and is connected to one of the two input terminals of the SPDT switch 412, which acts as an external input terminal, via the fourth external wiring line. The third and fourth external wiring lines are electrically insulated and physically cross each other.

One of the two input terminals of the 2×2 matrix switch 411 of the first pair and that of the 2×2 matrix switch 411 of the second pair are external input terminals and are connected via the fifth external wiring line. Likewise, the other of said input terminals of the 2×2 matrix switch 411 of the first pair and that of the 2×2 matrix switch 411 of the second pair are external input terminals and are connected via the sixth external wiring line. One of the two input terminals of the 2×2 matrix switch 421 of the first pair and that of the 2×2 matrix switch 421 of the second pair are external input terminals and are connected via the seventh external wiring line. The other of said input terminals of the 2×2 matrix switch 421 of the first pair and that of the 2×2 matrix switch 421 of the second pair are external input terminals and are connected via the eighth external wiring line.

When forming a 4×4 matrix switch device as mentioned above by using the 4×2 matrix switch device 610 shown in FIG. 3, the number of parts thereof becomes twenty or more. However, the number of parts of the 4×4 matrix switch device 50 according to the present invention is four. Therefore, the manufacturing cost can be much reduced.

Figure 12:
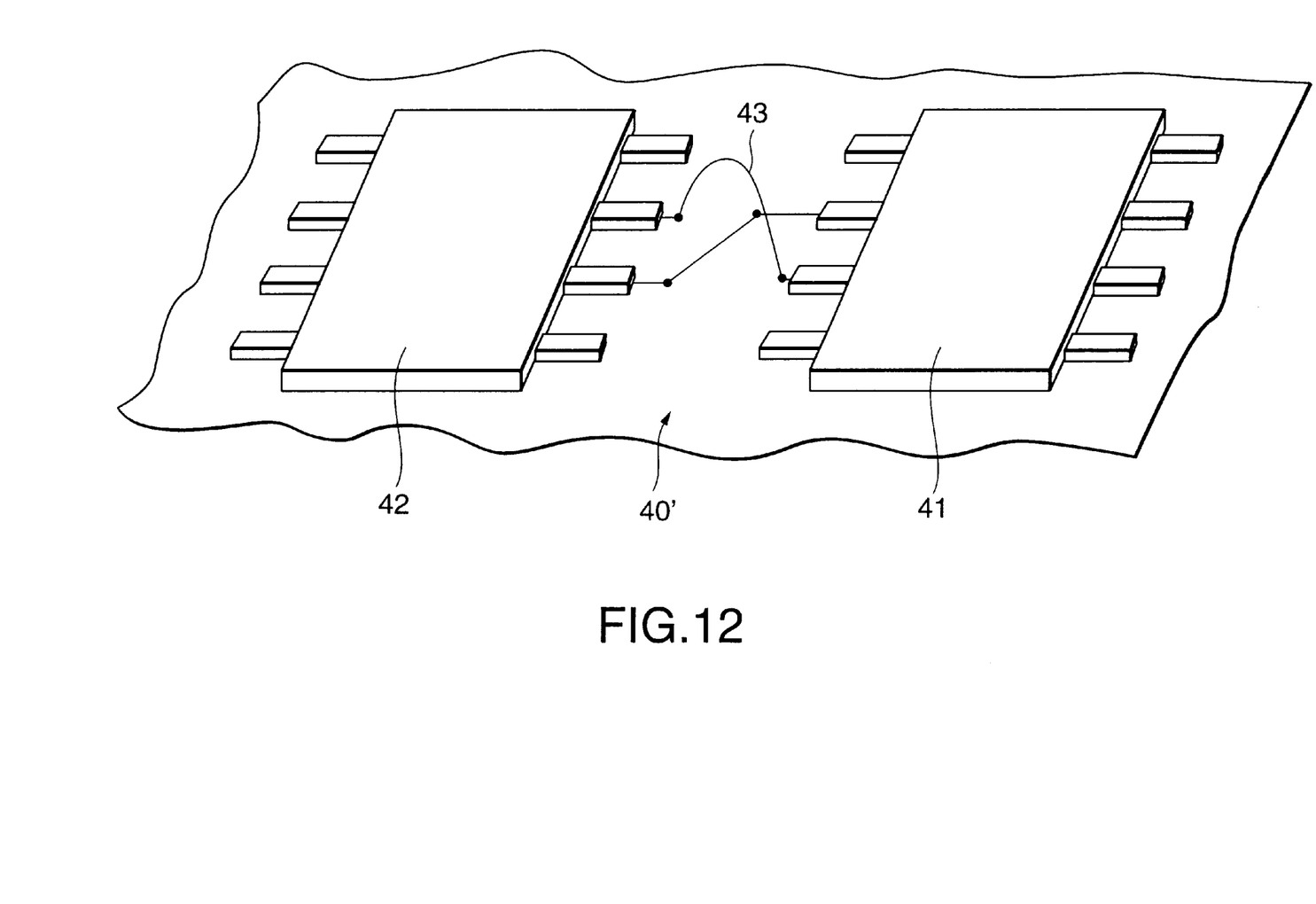
FIG. 12 is a schematic perspective view of a matrix switch device according to a sixth embodiment of the present invention.

FIG. 12 illustrates a 4×2 matrix switch device 40' according to a sixth embodiment of the present invention. The 4×2 matrix switch device 40' is a specific example of the matrix switch device 40 shown in FIG. 10. The 4×2 matrix switch device 40' comprises the two matrix SW devices 41 and 42 whose terminals are mirror-symmetrically disposed and a first external wiring line and a second external wiring line 43.

The matrix switch devices 41 and 42 are mounted on a printed electronic circuit board. Connection is performed between the external output terminal of the 2×2 matrix switch of the matrix switch device 41 and the external input terminal of the SPDT switch of the matrix switch 42 via the first external wiring line. Connection is performed between the external output terminal of the 2×2 matrix switch of the matrix switch device 42 and the external input terminal of the SPDT switch of the matrix switch 41 via the second external wiring line 43. The first external wiring line is printed on the printed electronic circuit board. The second external wiring line 43 passes over the first external wiring line. Therefore, electrical insulation is performed between the second external wiring line 43 and the first external wiring line, and the second external wiring line 43 physically crosses the first external wiring line. In FIG. 12, the shape of the second external wiring line 43 is conceptually illustrated for convenience and is different from the actual shape thereof.

According to the configuration, the 4×2 matrix switch device 40' can reduce the signal interference between the wiring lines and can achieve high isolation.

Figure 13A:
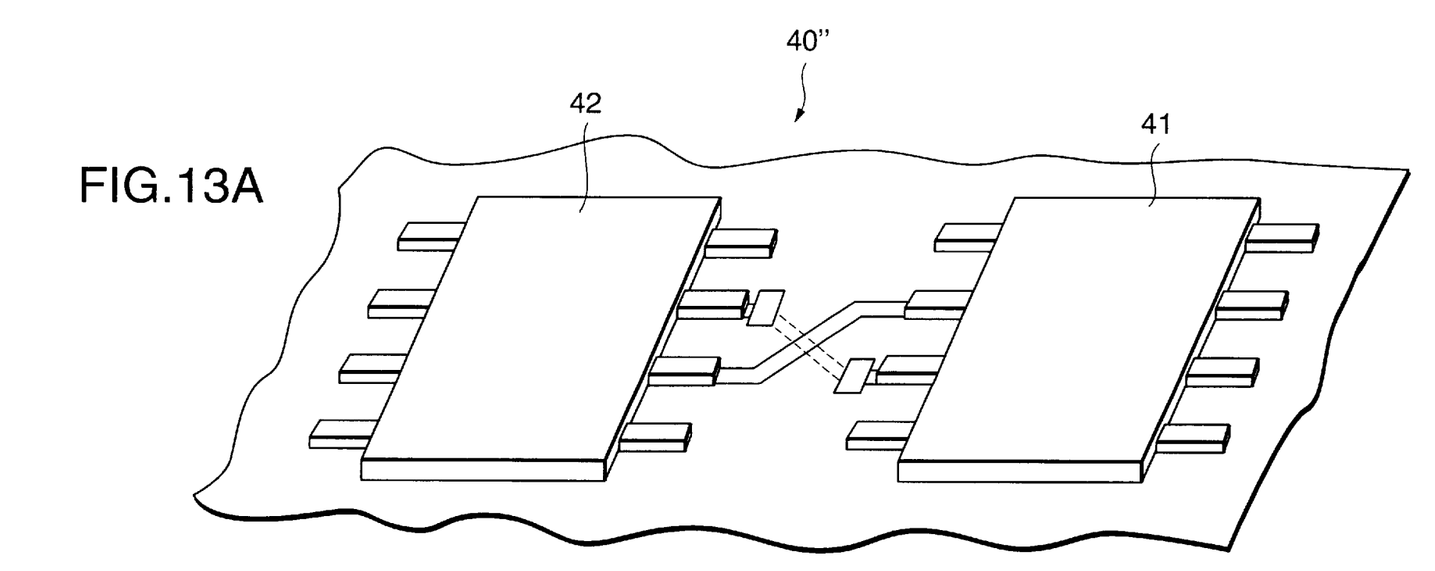
FIG. 13A is schematic perspective view of another matrix switch device.
Figure 13B:
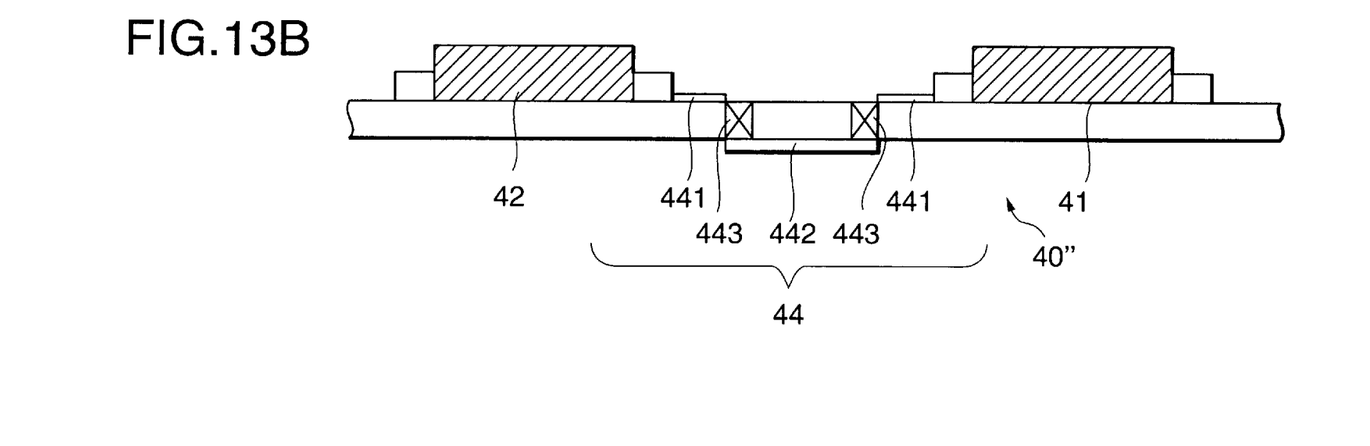
FIG. 13B is a schematic sectional view of the matrix switch device shown in FIG. 13A.

FIGS. 13A and 13B illustrate a 4×2 matrix switch device 40" according to a seventh embodiment of the present invention. The 4×2 matrix switch device 40" is another specific example of the matrix switch device 40 shown in FIG. 10. The 4×2 matrix switch device 40" comprises the two matrix SW devices 41 and 42 whose terminals are mirror-symmetrically disposed and an external wiring line and external wiring 44.

The matrix switch devices 41 and 42 are mounted on a printed electronic circuit board. Connection is performed between the external output terminal of the 2×2 matrix switch of the matrix switch device 41 and the external input terminal of the SPDT switch of the matrix switch 42 via the external wiring line. Connection is performed between the external output terminal of the 2×2 matrix switch of the matrix switch device 42 and the external input terminal of the SPDT switch of the matrix switch 41 via the external wiring 44. The first external wiring line is printed on the printed electronic circuit board. Electrical insulation is performed between the external wiring 44 and the external wiring line, and the external wiring 44 physically crosses the external wiring line.

That is to say, the external wiring 44 is formed on one of the surfaces of the printed electronic circuit board. The external wiring 44 comprises two wiring units 441, two through holes 443, and a wiring unit 442. One of the wiring units 441 is connected to the external output terminal of the 2×2 matrix switch of the matrix switch device 42, and the other wiring unit 441 is connected to the external input terminal of the SPDT switch of the matrix switch device 41. The two through holes 443 penetrate the printed electronic circuit board. The two through holes 443 are connected to the two wiring units 441, respectively. The wiring unit 442 is formed on the other surface of the printed electronic circuit board for inter-connecting the two through holes 43.

According to the configuration, the 4×2 matrix switch device 40" can reduce the signal interference between the wiring lines and can achieve high isolation.

Figure 14:
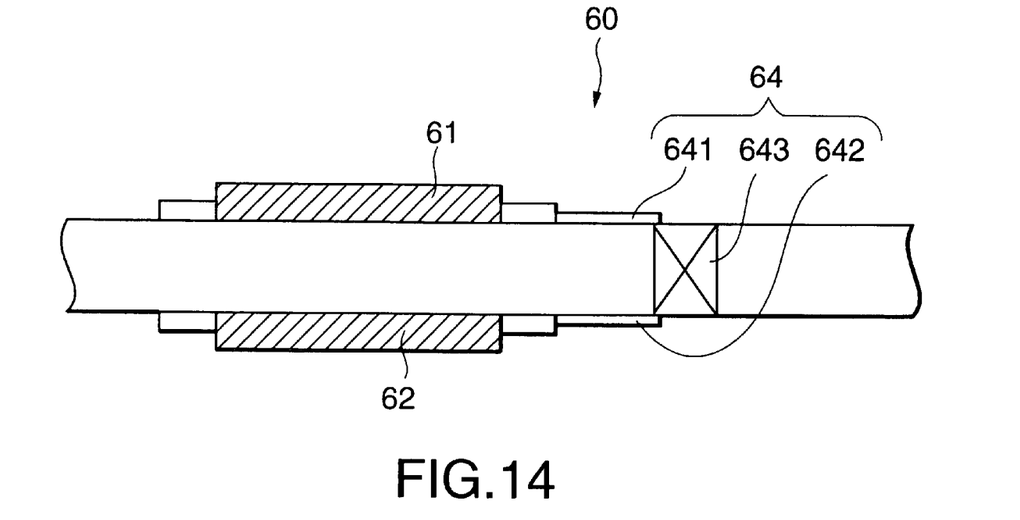
FIG. 14 is a schematic sectional view of a matrix switch device according to an eighth embodiment of the present invention.

FIG. 14 illustrates a 4×2 matrix switch device 60 according to an eighth embodiment of the present invention. The 4×2 matrix switch device 60 comprises two matrix switch devices 61 and 62 whose terminals are mirror-symmetrically disposed as in the case of the matrix switch device 40 shown in FIG. 10. The 4×2 matrix switch device 60 further comprises a first external wiring 64 and a second external wiring (not shown in the drawing).

The matrix switch device 61 is formed on one surface of the printed electronic circuit board and the matrix switch device 62 is formed on the other surface thereof. The first external wiring 64 connects the external output terminal of the 2×2 matrix switch of the matrix switch device 61 with the external input terminal of the SPDT switch of the matrix switch device 62. The second external wiring connects the external output terminal of the 2×2 matrix switch of the matrix switch device 62 with the external input terminal of the SPDT switch of the matrix switch device 61.

The first external wiring 64 and the second external wiring have the same configurations and are electrically insulated from each other.

The first external wiring 64 comprises a wiring unit 641, a wiring unit 642, and a through hole 643. The wiring unit 641 is formed on one surface of the printed electronic circuit board on which the matrix switch device 61 is mounted. Further, the wiring unit 641 is connected to the external output terminal of the 2×2 matrix switch in the matrix switch device 61. The wiring unit 642 is formed on another surface of the printed electronic circuit board on which the matrix switch device 62 is mounted. Further, the wiring unit 642 is connected to the external input terminal of the SPDT switch in the matrix switch device 62. The through hole 643 penetrates the printed electronic circuit board and inter-connects the wiring units 641 and 642.

The wiring units of the second external wiring are electrically insulated from the wiring units 641 and 642, and physically cross the same as in the case of the sixth embodiment.

The configurations of the matrix switch devices used in the third to eighth embodiments are the same as that of the matrix switch device 20 shown in FIG. 7. However, a different type of matrix switch can be used, the switch having the same configuration as that of the matrix switch device 20' shown in FIG. 8.

While the present invention has thus far been described in detail by way of the embodiments thereof, it will now be readily possible for those skilled in the art to put this invention into practice in various other manners.

What is claimed is:

1. A matrix switch device comprising a 2×2 matrix switch having two input terminals and two output terminals;

said matrix switch device further comprising an SPDT (Single Pole Double Throw) switch arranged at a stage subsequent to said 2×2 matrix switch, said SPDT switch having two input terminals and one output terminal;

said 2×2 matrix switch and said SPDT switch being structured in a semiconductor integrated circuit chip so as to unite with each other;

one of said output terminals of said 2×2 matrix switch and one of said input terminals of said SPDT switch are electrically connected with each other;

both of said input terminals of the 2×2 matrix switch, the other of said output terminals of the 2×2 matrix switch, the other of said input terminals of said SPDT switch, and said output terminal of said SPDT switch being led out of said semiconductor integrated circuit chip.

2. A matrix switch device comprising a 2×2 matrix switch having two input terminals and two output terminals;

said matrix switch device further comprising an SPDT (Single Pole Double Throw) switch arranged at a stage subsequent to said 2×2 matrix switch, said SPDT switch having two input terminals and one output terminal;

said 2×2 matrix switch and said SPDT switch being structured in a semiconductor integrated circuit chip so as to unite with each other;

both of said input terminals of the 2×2 matrix switch, both of said output terminals of the 2×2 matrix switch, both of said input terminals of said SPDT switch, and said output terminal of said SPDT switch being led out of said semiconductor integrated circuit chip.

3. A matrix switch device comprising, as a first and second matrix switch units, two of said matrix switch device according to claim 1 and performing as a 4×2 matrix switch device, said first matrix switch unit being packaged in a first package, said second matrix switch unit being packaged in a second package;

said matrix switch further comprising first and second external wiring lines;

the other of said output terminals of said 2×2 matrix switch of said first matrix switch unit and the other of said input terminals of said SPDT switch of said second matrix switch unit being electrically connected to each other via said first external wiring line outside said first and said second packages;

the other of said output terminals of said 2×2 matrix switch of said second matrix switch unit and the other of said input terminals of said SPDT switch of said first matrix switch unit via said second external wiring line outside said first and said second packages.

4. A matrix switch device according to claim 3, wherein said first and said second matrix switch units each further comprise at least two lead terminals functioning as said input terminals and said output terminals that are led out of said first and said second packages, said lead terminals of said first matrix switch unit and said lead terminals of said second matrix switch unit are mirror-symmetrically disposed on said first and said second packages, and electrical insulation is performed between said first and second external wiring lines, which cross each other.

5. A matrix switch device according to claim 4, further comprising a printed electronic circuit board, wherein said first external wiring line is formed on said printed electronic circuit board and said second external wiring line passes over said first external wiring line.

6. A matrix switch device according to claim 4, further comprising a printed electronic circuit board and at least two of through holes;

wherein said first external wiring line is formed on one surface of said printed electronic circuit board and said second external wiring line is formed on the other surface of said printed electronic circuit board via said through holes.

7. A matrix switch device according to claim 4, further comprising:

a printed electronic circuit board and at least two of through holes;

wherein said first and second matrix switch units are mounted on one surface and the other surface of said printed electronic circuit board, respectively, said first external wiring line electrically connects said first and said second matrix switch units via said through holes, said second external wiring line overpasses said first external wiring line on one surface or the other surface of said printed electronic circuit board and electrically connects said first and said second matrix switch units via said through holes.

8. A matrix switch device comprising, as a first through fourth matrix switch units, four of said matrix switch device according to claim 1 and performing as a 4×4 matrix switch device, said first matrix switch unit being packaged in a first package, said second matrix switch unit being packaged in a second package, said third matrix switch unit being packaged in a third package, said fourth matrix switch unit being packaged in a fourth package;

said matrix switch further comprising first through fourth external wiring lines;

the other of said output terminals of said 2×2 matrix switch of said first matrix switch unit and the other of said input terminals of said SPDT switch of said second matrix switch unit being electrically connected to each other via said first external wiring line outside said first and said second packages;

the other of said output terminals of said 2×2 matrix switch of said second matrix switch unit and the other of said input terminals of said SPDT switch of said first matrix switch unit being electrically connected to each other via said second external wiring line outside said first and said second packages;

the other of said output terminals of said 2×2 matrix switch of said third matrix switch unit and the other of said input terminals of said SPDT switch of said fourth matrix switch unit being electrically connected to each other via said third external wiring line outside said third and fourth packages;

the other of said output terminals of said 2×2 matrix switch of said fourth matrix switch unit and the other of said input terminals of said SPDT switch of said third matrix switch unit being electrically connected to each other via said fourth external wiring line outside said third and fourth packages;

one of said input terminals of said 2×2 matrix switch of said first matrix switch unit and one of said input terminals of said 2×2 matrix switch of said third matrix switch unit being electrically connected to each other via said fifth external wiring line outside said first and third packages;

the other of said input terminals of said 2×2 matrix switch of said first matrix switch unit and the other of said input terminals of said 2×2 matrix switch of said third matrix switch unit being electrically connected to each other via said sixth external wiring line outside said first and said third packages;

one of said input terminals of said 2×2 matrix switch of said second matrix switch unit and one of said input terminals of said 2×2 matrix switch of said fourth matrix switch unit being electrically connected to each other via said seventh external wiring line outside said second and said fourth packages;

the other of said input terminals of said 2×2 matrix switch of said second matrix switch unit and the other of said input terminals of said 2×2 matrix switch of said fourth matrix switch unit being electrically connected to each other via said eighth external wiring line outside said second and said fourth packages.

* * * * *